UNITED STATES PATENT OFFICE.

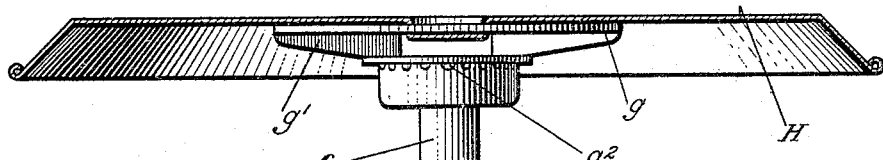
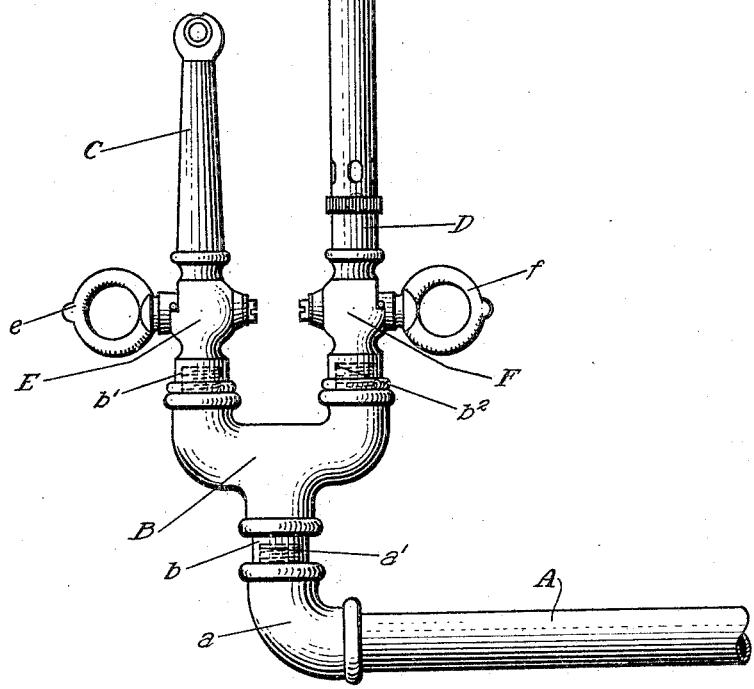
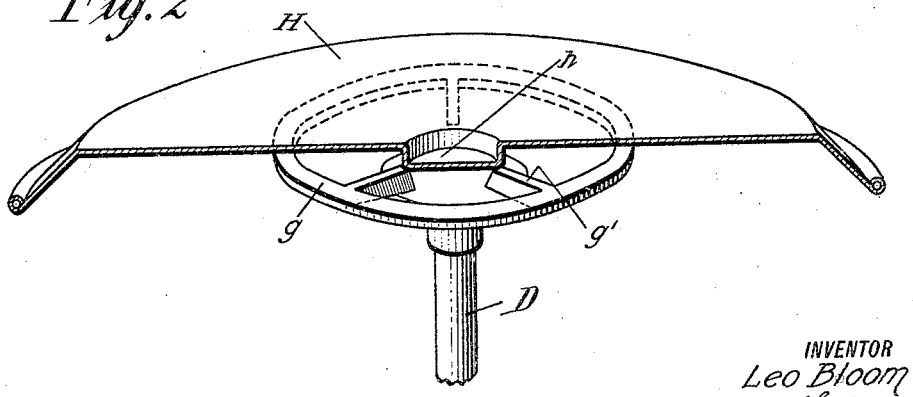

LEO BLOOM, OF BROOKLYN, NEW YORK.

COMBINED GAS BURNER AND HEATER.

1,400,719.   Specification of Letters Patent.   Patented Dec. 20, 1921.

Application filed November 9, 1920. Serial No. 422,849.

*To all whom it may concern:*

Be it known that I, LEO BLOOM, a citizen of the United States, residing at New York city, borough of Brooklyn, in the county of Kings, and State of New York, have invented a certain new and useful Combined Gas Burner and Heater, of which the following is a specification.

This invention is a gas burner and heater and is adapted to be mounted on a gas fixture in the position usually occupied by the conventional burner tip and utilized for lighting, heating or cooking purposes.

The object of the invention is to provide a device of simple construction, one which may be sold at hardware or fixture stores and installed by the purchaser in a simple and efficient manner, thereafter to be used for the purposes specified.

A further object of the invention is to so construct the device that the lighting elements thereof may be controlled independently of the heating and cooking elements thereof.

It has heretofore been suggested to control the flow of gas to both the lighting and cooking elements by means of a single gas cock, which, when in one position, supplies the gas to the lighting burner and shuts off the gas from the cooking burner and when, in another position, supplies the gas vice versa. Such cock has further been made so as to permit of the operation of both lighting and cooking burners at the same time, but with such devices it is extremely difficult to know before turning the handle of the burner cock what is going to happen, and, not infrequently, the cock is operated improperly so as to turn off gas from the burner which it is desired to continue in operation and supply gas to the burner which it is desired to remain inoperative.

In accordance with the present invention, a person can tell at a glance how to operate the device since each burner is controlled by a separate cock, operating in a well known conventional way.

Another feature of this invention is the incorporation in the device, in conjunction with the cooking burner, of a heating plate which may be heated by the cooking burner and is adapted in turn to radiate its heat for the purpose of heating a room.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of a device embodying the present invention; and.

Fig. 2 is a perspective view of the cooking burner of said device showing a heating attachment which I employ in central section and in dotted lines.

Referring to the drawings, A designates a conventional gas fixture, such as are commonly installed in buildings and dwellings. This fixture is provided at its outer end with an elbow $a$ provided with an upstanding threaded portion $a'$ adapted to receive the usual burner tip for illuminating purposes.

The device of the present invention embodies a body portion B, preferably in the form of a casting, forming a three way union. The casting is provided with a depending shank $b$ which is interiorly threaded to screw on to the threaded portion $a'$ of the elbow $a$ and has two upstanding threaded nipples $b'$ and $b^2$. The casting B is cored or made hollow so gas may be supplied from the fixture A through either one of the threaded nipples $b'$ and $b^2$.

Screwed upon the threaded nipple $b'$ is a plug cock E provided with the usual finger piece $e$, while on the nipple $b^2$ is a like cock F, provided with a finger piece $f$. Through the operations of the finger pieces $e$ and $f$ the supply of gas may be regulated and controlled.

Screwed on to the plug cock E is a burner tip C of the kind commonly employed for lighting purposes, while screwed on to the cock F is a Bunsen tube D, the upper end of which carries a heating burner G. The heating burner G embodies an annular plate $g$ supported by radial arms $g'$ and gas, issuing from holes $g^2$ in the burner is ignited exteriorly of said holes and the flames coil up through the annular plate for the purpose of heating the receptacle supported on said plate.

The burner tip C and cooking burner G are preferably so related in position that if flame is burning at either, the turning on of the other will result in ignition of the gas at the burner last turned on.

If it is desired to use the device for illuminating purposes only, the plug cock F will be turned off and the plug cock E turned on and gas ignited at the tip C. If it is now desired to cook on the plate $g$, it is only necessary to turn on the plug cock F, whereupon the gas will immediately ignite at the burner G and cooking may be carried on. Of course it will be understood that the burner G may be operated to the exclusion of the illuminating tip C, that, in fact, either may be used without the other or both may be used together through proper manipulation of the cocks E and F.

In order that the device may be efficiently employed to heat a room, a radiating member H is provided which may vary in form, but is shown in the drawings as consisting of a sheet metal plate. This plate is provided at its center with a depending portion $h$ which may be formed by stamping down the center of the plate or by mounting a separate member thereon and this depending portion, which in either event, is in the form of a boss, is adapted to occupy a position between the inner ends of the radial arms $g'$ when the radiating plate is laid upon the cooking plate $g$ after the manner shown in Fig. 2. The boss $h$ will centralize the radiating plate with reference to the burner and preclude said plate from inadvertent dislodgment, although the plate may be readily lifted off in the event it is desired to employ the burner $g$ for cooking purposes.

When the radiating plate H is employed, it will manifestly become highly heated when gas is ignited at the burner G and will serve to radiate its heat throughout the room for the purpose of raising the temperature of the room.

It will be manifest from the foregoing detailed description of the invention that the device is extremely simple and yet highly efficient in the carrying out of its intended functions. No skill whatsoever is required to manipulate or operate the same, and, being very compact, it is particularly adapted for use in the sick room or in the nursery where food or heat applications are required from time to time especially at night. The present invention is not, however, restricted to these specific uses, but is adapted for broad application.

The device may be economically manufactured and embodies several stock fittings, which may be bought in the open market and assembled with ease and dexterity.

Having thus fully described the invention, what I claim as new and desire to secure by Letters Patent is:

1. A device of the class described embodying an integral three way T-shaped union, the horizontal portion of which is formed, intermediate its ends, with a depending interiorly threaded leg adapted to screw onto a gas fixture and the opposite ends of which portion are formed with upstanding parallel, exteriorly threaded arms, an upstanding plug-valve casing screwed onto each arm and each casing having a male threaded portion at its top, a separately and independently operable plug valve in each casing for controlling the flow of gas therethrough, an upstanding burner tip screwed onto the male threaded portions of one valve casing, an upstanding Bunsen tube screwed onto the male threaded portion of the other valve casing and extending upwardly beyond the top of the burner tip, a cooking burner mounted on the top of the Bunsen tube, and a pan supporting grid mounted on the cooking burner.

2. A device of the class described embodying an intergral three way T-shaped union, the horizontal portion of which is formed, intermediate its ends, with a depending interiorly threaded leg adapted to screw onto a gas fixture and the opposite ends of which portion are formed with upstanding parallel, exteriorly threaded arms, an upstanding plug-valve casing screwed onto each arm and each casing having a male threaded portion at its top, a separately and independently operable plug valve in each casing for controlling the flow of gas therethrough, an upstanding burner tip screwed onto the male threaded portions of one valve casing, an upstanding Bunsen tube screwed onto the male threaded portion of the other valve casing and extending upwardly beyond the top of the burner tip, a cooking burner mounted on the top of the Bunsen tube, and a pan supporting grid mounted on the cooking burner, in combination with a radiating plate of larger dimensions than the grid and provided at its center with a depending portion adapted to interfit with the grid to demountably maintain the plate in centralized portion wherein it will overlie both the cooking burner and the burner tip, the latter of which may be used to produce a simmering flame.

In testimony whereof, I have signed my name to this specification.

LEO BLOOM.